(12) United States Patent
Thiele et al.

(10) Patent No.: US 8,092,632 B2
(45) Date of Patent: Jan. 10, 2012

(54) METHOD FOR PRIMERLESS ADHESIVE BONDING OF METAL OR PLASTICS SUBSTRATES

(75) Inventors: Lothar Thiele, Langenfeld (DE); Karin Jonscher, Duesseldorf (DE)

(73) Assignee: Henkel AG & Co. KGAA, Duesseldorf (DE)

( * ) Notice: Subject to any disclaimer, the term of this patent is extended or adjusted under 35 U.S.C. 154(b) by 141 days.

(21) Appl. No.: 12/613,267

(22) Filed: Nov. 5, 2009

(65) Prior Publication Data
US 2010/0071846 A1    Mar. 25, 2010

Related U.S. Application Data

(63) Continuation of application No. PCT/EP2008/053957, filed on Apr. 2, 2008.

(30) Foreign Application Priority Data
May 7, 2007  (DE) .......................... 10 2007 021 794

(51) Int. Cl.
*B32B 37/12*   (2006.01)
(52) U.S. Cl. .......... 156/281; 156/299; 528/74.5; 528/85
(58) Field of Classification Search .................. 156/281, 156/299; 528/74.5, 85
See application file for complete search history.

(56) References Cited

U.S. PATENT DOCUMENTS

| 2004/0138402 A1 * | 7/2004 | Thiele et al. ................. 528/74.5 |
| 2007/0267141 A1 | 11/2007 | Ehrmann |

FOREIGN PATENT DOCUMENTS

| DE | 412 8649 A1 | 3/1993 |
| DE | 44 01 572 A1 | 7/1995 |
| DE | 44 12 759 A1 | 10/1995 |
| DE | 102004057988 A1 | 6/2006 |
| EP | 1366132 B1 | 12/2003 |
| WO | WO 9305008 | 3/1993 |
| WO | WO 9520002 A1 | 7/1995 |
| WO | WO 02/066572 A | 8/2002 |

OTHER PUBLICATIONS

International Search Report, International Application No. PCT/EP2008/053957, mailed Sep. 16, 2008.

* cited by examiner

*Primary Examiner* — Katarzyna Wyrozebski Lee
*Assistant Examiner* — Daniel Lee
(74) *Attorney, Agent, or Firm* — James E. Piotrowski; Steven C. Bauman

(57) ABSTRACT

The invention relates to a method for bonding metal or plastic substrates, in which the substrate is freed from adhering impurities, a dual-component polyurethane adhesive is directly applied onto at least one substrate without prior application of a primer and the substrates are joined and cured. According to the invention, the dual-component polyurethane adhesive is composed of a component A, containing 1 to 98% by weight with reference to the component A of an oleochemic polyol, 1 to 10% by weight of at least one three-, four- or five-functional polyol with a molecular weight of 90 to 750 g/mol, 2.5 to 60% by weight of at least on aldehyde resin, keton resin and/or keton/aldehyde resin with a molecular weight of 250 to 25000 g/mol, and 0 to 70% by weight of other additives and a component B, containing at least one polyisocyanate, the NCO/OH ratio of the isocyanate component to the polyol component ranging between 1.0 and 2.0:1.

15 Claims, No Drawings

METHOD FOR PRIMERLESS ADHESIVE BONDING OF METAL OR PLASTICS SUBSTRATES

CROSS REFERENCE TO RELATED APPLICATIONS

This application is a continuation of International Application No. PCT/EP2008/053957, filed Apr. 2, 2008, which claims the benefit of German Patent Application No. 102007021794.5 filed May 7, 2007, the contents of each of which are incorporated herein by reference in their entirety.

The invention relates to a method for adhesive bonding of metal or plastics substrates with two-component polyurethane adhesives, in which the substrates are not pretreated with primers. The invention additionally provides a correspondingly suitable two-component polyurethane (PUR) adhesive.

Polyurethane adhesives are known per se. For instance, DE 44 12 759 A1 describes a one-component polyurethane adhesive which is distinguished by a content of 50 to 95 wt. % of an isocyanate-containing polyurethane prepolymer together with hydrophobic silicon dioxide pigments and molecular sieve powders, and optionally by further conventional additives and/or accelerators. One disadvantage is the long pressing time of the described wood bond. The short pressing times of two-component polyurethane-based adhesives cannot in principle be achieved with one-component polyurethane adhesives.

Other polyurethane adhesives are also known. For instance, DE 44 01 572 A1 describes two-component polyurethane adhesives based on an isocyanate component and a polyol component, which, in addition to an oleochemical polyol, contains 2 to 7 weight percent, relative to the oleochemical polyol, of at least one di- and/or trifunctional alcohol, and in which the hydroxyl value of the alcohols or the mixtures thereof amounts to 1100 to 1850. These compositions may be used for adhesively bonding rigid or flexible substrates, in particular plastics, metals, glass or wood.

EP 136 6132 A1 is also known. Two-component PUR adhesives are described therein which contain various resins dissolved in the polyol component. Wooden materials are preferably adhesively bonded. Various further substrates are listed, inter alia also glass, metal or plastics material. No selection of the resins and adhesive bonding conditions is mentioned.

The adhesive bonding of metal or plastics substrates generally requires pretreatment of the substrates. For example, they have to be pretreated by specific methods, such as corona treatment, plasma treatment or flame treatment, or chemical pretreatment is carried out. A primer, which frequently contains solvent, is then conventionally applied. This procedure sometimes requires considerable extra technical effort. The use of solvents is environmentally questionable.

The object arises from this prior art of providing an adhesive which allows simplified adhesive bonding of metals or plastics surfaces and with which it is possible to dispense with the application of reactive or solvent-containing primers. Furthermore, it is intended to achieve an improved adhesive bond which cures even under moist crosslinking conditions and which does not fail on long-term exposure to humid conditions.

The present invention thus provides a method for adhesive bonding of metal or plastics substrates, in which adhering contaminants are removed from the substrate, a two-component polyurethane adhesive is applied directly onto a substrate without previously applying a primer and the substrates are fitted together and cured, in which the two-component polyurethane adhesive consists of a polyol component A containing 1 to 98 wt. % relative to the component of at least oleochemical polyol, 1 to 10 wt. % of at least one tri-, tetra- or penta-functional polyol with a molecular weight of 90 to 750 g/mol, 2.5 to 60 wt. % of at least one aldehyde, ketone or ketone/aldehyde resin with a molecular weight of 250 to 25000 g/mol, and 0 to 70 wt % of further auxiliary substances and a component B containing at least one polyisocyanate, in which the NCO:OH ratio of the isocyanate component to the polyol component is between 1.0 and 2.0:1.

A wide range of metal or plastics substrates are suitable as substrates. Examples of such materials are steel, stainless steel, copper, brass, aluminum, anodized aluminum, aluminum alloys, ABS, epoxy resins, polystyrene, polyamide, polymethyl methacrylate (PMMA), polyesters, polycarbonate, PVC. They may be rigid substrates or flexible sheets.

The polyol component A consists of a mixture of per se known diols and polyols and tri- or more highly functional short-chain polyols.

"Oleochemical polyols" are taken to mean polyols based on natural oils and fats, for example the reaction products of epoxidized fatty substances with mono-, di- or polyfunctional alcohols, or glycerol esters of long-chain fatty acids, which are at least partially substituted with hydroxyl groups.

Examples of such compounds are ring-opening products of epoxidized triglycerides, i.e. epoxidized fatty acid glycerol esters, in which ring opening has been performed while retaining the ester bonds. To produce the ring-opening products, it is possible to start from a wide range of epoxidized triglycerides of plant or animal origin. Suitable epoxidized triglycerides are accordingly those which comprise 2 to 10 weight percent of epoxy oxygen. Such products may be produced by epoxidation of the double bonds of a range of fats and oils, in particular epoxidized triglycerides.

The alcohols which may be used for ring opening of the epoxidized triglycerides include methanol, ethanol, propanol, isopropanol, butanol, hexanol, 2-ethylhexanol, fatty alcohols with 6 to 22 C atoms, cyclohexanol, benzyl alcohol, 1,2-ethanol, 1,2-propanediol, 1,3-propanediol, 1,4-butanediol, 1,6-hexanediol, neopentyl glycol, trimethylolpropane, glycerol, trimethylolethane, pentaerythritol, sorbitol and ether group-containing hydroxyl compounds such as alkyl glycols or oligomeric glycols and oligomeric glycerols.

The ring-opening reaction of epoxidized fatty acid esters or triglycerides with an alcohol may optionally be followed by transesterification with themselves or other, subsequently added triglycerides. Such oleochemical polyols are described for example in German patent application DE-A141 28 649.

A further group of oleochemical polyols are ring-opening and transesterification products of epoxidized fatty acid esters of lower alcohols, i.e. of epoxidized fatty acid methyl, ethyl, propyl or butyl esters. Preference is here given to the ring-opening or transesterification products with alcohols of a functionality of 2 to 4, in particular the reaction products with ethylene glycol, propylene glycol, oligomeric ethylene glycols, oligomeric propylene glycols, glycerol, trimethylolpropane or pentaerythritol. The production of such products may proceed according to known epoxidation or ring-opening methods, in which transesterification may be performed during or after the ring-opening step by removing the lower alcohol from the reaction equilibrium.

Oleochemical polyols likewise include reaction products of epoxidized fatty alcohols with C2-C8 alcohols of a functionality of 1 to 10, in particular of 2 to 4.

For the purposes of the invention, it is also possible to use oleochemical polyols which are obtainable by way of the transesterification of di- or polyfunctional alcohols, such as for example the addition product of ethylene oxide or propylene oxide onto glycerol with triglycerides.

These oleochemical polyols may have hydroxyl values of 50 to 400, preferably of 100 to 300.

Particular preference is given to the use of castor oil and dimer diols together with those polyester polyols which are produced by complete ring opening of epoxidized triglycerides of a fat mixture containing at least in part an olefinically unsaturated fatty acid with one or more alcohols having 1 to 12 C atoms and subsequent partial transesterification of the triglyceride derivatives to yield alkyl ester polyols having 1 to 12 C atoms in the alkyl residue.

Furthermore, the adhesive usable according to the invention must contain at least one tri- or polyhydric polyol. The crosslink density of the adhesive can be adjusted by the quantity. Low molecular weight polyols or mixtures thereof are suitable as tri- or more highly functional polyols. The molecular weight should be between 90 and 750 g/mol. Particular preference is given to polyols with 3, 4 or 5 OH groups such as glycerol, triethanolamine, pentaerythritol, propoxylated or ethoxylated ethylenediamine, trimethylolpropane, trimethylolethane, neopentyl alcohol or addition products of ethylene or propylene oxide onto glycerol or trimethylolpropane.

In addition to these low molecular weight tri- and more highly functional polyols, the higher molecular weight polyols known from PUR production may also be used in a quantity of 0 to 70, in particular 0.5 to 50 wt. %, relative to the polyol component overall. Liquid polyhydroxy compounds in particular with two or three hydroxyl groups per molecule are preferably suitable as higher molecular weight polyols. Examples thereof are di- and/or trifunctional polyalkylene glycols in the molecular weight range higher than 750 to 6000 g/mol, preferably in the range from 1000 to 3000 g/mol, in particular polypropylene glycols. Random and/or block copolymers of ethylene oxide and propylene oxide may also be used. A further group of polyether polyols which may preferably be used are polytetramethylene glycols, which are produced for example by acidic polymerization of tetrahydrofuran. In this case, the molecular weight range of the polytetramethylene glycols is between 300 and 6000 g/mol, preferably in the range from 500 to 4000 g/mol.

In addition, the higher molecular weight polyols may comprise liquid polyesters, which may be produced by condensation of di- or tricarboxylic acids, such as for example adipic acid, sebacic acid and glutaric acid, with lower molecular weight diols or triols, such as for example ethylene glycol, propylene glycol, diethylene glycol, triethylene glycol, dipropylene glycol, 1,4-butanediol, 1,6-hexanediol, glycerol or trimethylolpropane. A further group of such polyols which may be used comprises the polyesters based on ε-caprolactone, also known as "polycaprolactones", as well as polycarbonate polyols. These should here have a molecular weight range of 300 to 6000 g/mol, preferably a range of 500 to 3000 g/mol (molecular weight as obtainable by GPC).

To achieve improved rigidity even under humid ambient conditions, the adhesive suitable according to the invention preferably does not contain any low molecular weight diols, for example with a molecular weight of below 300 g/mol. These have an unfavorable influence on the water stability of the adhesive bond.

The quantity of oleochemical polyol should amount to 1 to 98 wt. %, in particular 20 to 95 wt %. The quantity of more highly functional polyols should amount to 1 to 10 wt. %, in particular 2 to 7.5 wt. %, in each case relative to the polyol component A.

The polyol component A may additionally contain a resin. This comprises liquid to solid organic products, for which a more or less wide distribution of the relative molar mass is characteristic. They generally have an amorphous structure. It is advantageous for the resins to form homogeneous, i.e. streak-free, solutions in the polyol component at 20° C. Known resins may be used, whether of natural or synthetic origin. Natural resins may be of both plant and animal origin. Examples thereof are shellac and rosin resins, such as tall oil resin, gum resin or wood resin. Not only are natural resins, but also the derivatives thereof suitable, such as dimerized, hydrogenated, esterified or neutralized resins. Synthetic resins are obtained in general by polymerization or polycondensation. Examples thereof are hydrocarbon, terpene, cumarone/indene, furan, alkyd, aldehyde, ketone, ketone/aldehyde, phenol, glycerol ester, polyester, epoxy, urea, melamine, polyamide and isocyanate resins.

In particular, the two-component PUR adhesives suitable according to the invention must contain resins which comprise nonpolar fractions and additionally polar groups, in particular reactive groups. Particularly suitable resins are aldehyde or ketone and ketone/aldehyde resins. The adhesive according to the invention must contain at least fractions of these. By selection of the resins, improved adhesion to the polar or nonpolar surfaces of the substrates is obtained. The presence of the reactive groups, in particular OH groups, then allows strong incorporation into the polymer matrix in the course of crosslinking, so improving cohesion. The quantity of the resins may amount to 2.5 wt. % to 60 wt. % relative to component A, in particular to between 5 to 40 wt %.

Polyisocyanates may be used as component B). These are stored separately from the polyol component and only mixed with polyol component A) immediately before adhesive bonding.

The polyisocyanates are polyfunctional. Suitable polyfunctional isocyanates preferably contain on average 2 to at most 5, preferably up to 4 and in particular 2 or 3 NCO groups. These comprises for example aliphatic isocyanates, such as hexane 1,6-diisocyanate (HDI), 1,6-diisocyanato-2,2,4-trimethylhexane, dimer fatty acid diisocyanate; cycloaliphatic isocyanates, such as hydrogenated MDI ($H_{12}$MDI), xylylene diisocyanate (XDI), m- and p-tetramethylxylylene diisocyanate (TMXDI), 1-isocyanatomethyl-3-isocyanato-1,5,5-trimethylcyclohexane (IPDI); aromatic isocyanates, such as tolylene diisocyanate (TDI) and the isomers thereof, 2,4'- or 4,4'-diphenylmethane diisocyanate (MDI), 1,3- or 1,4-phenylene diisocyanate, 1,5-naphthylene diisocyanate.

The di- or polyisocyanates used are preferably aromatic isocyanates, for example diphenylmethane diisocyanate, either in the form of pure isomers, as an isomer mixture of 2,4'-/4,4'-isomers, or diphenylmethane diisocyanate (MDI) liquefied with carbodiimide, which is known a "crude MDI". Use may furthermore be made of low molecular weight oligomeric reaction products of MDI or of tolylene diisocyanate (TDI) with low molecular weight diols, such as for example ethylene glycol, diethylene glycol, propylene glycol, dipropylene glycol or triethylene glycol. Aromatic isocyanates with a functionality of 2 to 4 are preferred.

The ratio of the NCO groups contained in the isocyanate component to the OH groups contained in the polyol component is in the range from 1.0:1 to 2.0:1, a slight excess of NCO groups being convenient in the event of substrate dampness. In particular, the ratio is between 1.03:1 to 1.8:1.

The two-component polyurethane adhesives usable according to the invention may additionally contain auxiliary materials, which are preferably admixed wholly or partially with the polyol component. These include substances which are generally added to modify the characteristics of the essential components in the desired direction, for example to adapt processability, storage life and service characteristics to the intended application. Examples thereof are finely divided fillers, leveling agents, deaerating agents, thixotroping agents, catalysts, antioxidants, UV stabilizers, dyes, solvents and wetting agents.

Suitable fillers and/or pigments are inorganic compounds which are not reactive towards isocyanates, such as chalk, coated chalk, powdered chalk, calcium/magnesium carbonates, aluminum oxides and hydroxides, precipitated silica, titanium dioxide, barium sulfate, zeolites, bentonites, glass, hollow spheres, ground minerals, provided that they assume powder form, i.e. have a grain size of between 1 and 200 μm, in particular of between 3 and 50 μm. After mixing, such fillers are present in the two-component polyurethane adhesive in dispersed form.

Furthermore, leveling agents, bonding agents, plasticizers and/or stabilizers or fight stabilizers may be included. Solvents may be added, but the adhesives are preferably solvent-free.

The two-component polyurethane adhesives usable according to the invention may react directly with one another at room temperature. However, catalysts may also be present to accelerate the reaction at low temperatures too. These comprise known organometallic compounds such as tin(II) salts of carboxylic acids, such as tin(II) acetate, tin(II) ethylhexonate and tin(II) diethylhexoate, strong bases such as alkali hydroxides, alkali alkoxides and alkali phenolates, di-n-octyltin mercaptide, dibutyltin maleate, dibutyltin diacetate, dibutyltin dilaurate, dibutyltin dichloride, dibutyltin bisdodecylmercaptide or lead phenylethyl dithiocarbaminate.

Aliphatic or cycloaliphatic tertiary amines are also suitable, in particular those which additionally bear groups which are still reactive towards isocyanates. Examples of such amines are dialkyl ethanolamine with C1 to C3 alkyl residues, trialkanolamine with C1 to C6 alkanol groups, tricyclohexanolamine, diethanolalkylamine with C1 to C6 alkyl residues, diethanolphenylamine, diazabicyclooctane (Dabco), triethylamine, di methylbenzylamine, bisdimethylaminoethyl ether, tetramethylguanidine, bisdimethylaminomethylphenol, 2,2'-dimorpholinodiethyl ether, bis(2-dimethylaminoethyl)ether, N,N-dimethylpiperazine, N,N,N,N-tetramethylalkane-1,3-diamine with C3 to C6 alkane residue.

The catalysts may be present in quantities of between 0.01 and 3 wt. %, in particular between 0.1 and 2 wt. %. In total, the auxiliary materials may be present in quantities of between 0 to 70 wt. % relative to component A, preferably between 0.5 and 50 wt. %.

The two-component polyurethane adhesive usable according to the invention is produced by first of all producing the polyol component. To this end, first of all a solution of the resin in one or all of the polyols is produced, by optionally heating the mixture to 100° C. with stirring. The auxiliary materials are then admixed. The auxiliary materials may also be admixed wholly or partially with the isocyanate component, providing the latter does not react with the isocyanates. These two components are conventionally stored separately until use. For use, these two components are mixed together in a manner known per se and the mixture is applied to the substrates to be adhesively bonded.

According to the method of the invention, the surfaces of the substrates are cleaned of contaminants prior to adhesive bonding; the surface may optionally be sanded or roughened. This may be effected for example by blasting, stripping or wiping. Pretreatment, for example by corona treatment, by solvent attack of the surface with halogen-containing solvents or by application of a primer to the substrate is not necessary. Primers should here be understood to mean those aqueous, solvent-containing or liquid coating compositions or those applied from the gas phase which are situated between the substrate surface and the subsequent adhesive layer and are applied to improve adhesion or as an anticorrosion layer.

The adhesive suitable according to the invention is applied onto the cleaned substrate. The film thickness should be between 0.1 and 1 mm, in particular between 0.2 and 0.4 mm. The adhesive may be applied to one substrate surface, but it is also possible for both substrate surfaces to be coated with the adhesive.

When proceeding by the method according to the invention the suitable two-component PUR adhesives are mixed in the predetermined mixing ratio. They are then applied to the suitable substrates, in particular metal substrates or plastics substrates. The temperature of substrates and adhesive should here be between 15 and 70° C., in particular between 20 and 35° C. When mixed, the adhesive should be of low viscosity to pasty and also thixotropic at the application temperature. The adhesive may be applied using per se known procedures, for example by brushing, spraying or roller application.

The two substrates are then fitted together. It may optionally be convenient to press the substrates together briefly so as to ensure that no air is trapped between the two substrates and to bring about contact over the entire surface. Providing the adhesive has not yet cured, it is convenient to immobilize the substrates relative to one another.

The adhesively bonded substrates can then cure. Curing should be performed in general at temperatures of between 15 and 60° C., in particular up to 30° C. Markedly faster curing may be observed at an elevated temperature. It is sufficient, however, to proceed at low temperatures. At least one catalyst is then preferably present in the two-component PUR adhesive.

Crosslinking is completed after 30 minutes to 24 hours as a function of catalyst concentration. The bond area can then be subjected to load. In a particularly advantageous mode of operation, it is convenient to cure the adhesive at ambient temperature. If the adhesive bond is heat-treated after crosslinking, i.e. is subjected to thermal ageing at temperatures of between 30 and 80° C., the strength of the adhesive bond is increased. Care should be taken to ensure that the substrate, for example a plastics substrate, is not destroyed at the elevated temperature. The duration should amount in this case to 5 to 200 hours.

A further advantage of the method suitable according to the invention is that this adhesive also cures in bubble-free manner and without foaming under humid environmental conditions. Exposure of the substrate to rain or high atmospheric humidity during adhesive bonding does not lead to foaming of the adhesive bond. Good adhesion is accordingly ensured even under difficult conditions of use.

By using PUR adhesives suitable according to the invention for adhesive bonding of metal or plastics substrates it is possible, without further pretreatment, to produce adhesive bonds which exhibit a tensile shear strength of over 10 MPa on metal substrates after exposure to atmospheric humidity. In the case of plastics substrates said strength is over 4 MPa.

The adhesive usable according to the invention is particularly suitable for adhesively bonding components which are exposed to moisture in service. In particular, rigid substrates can be adhesively bonded together and even flexible substrates can be effectively adhesively bonded to rigid substrates. In the case of adhesive bonding performed according to the invention, it may be observed that, even with frequent exposure to high atmospheric humidity or with exposure to liquid water, the adhesive bond is not significantly weakened. It may for example be noted that, after a repeated alternating climate test, i.e. exposing the adhesive bond to elevated atmospheric humidity and elevated temperature, no drop in bond strength is observed.

The following Examples will now illustrate the invention by way of example.

|  | Example | | | |
|---|---|---|---|---|
|  | 1 (Comparison) | 2 (Comparison) | 3 | 4 |
| Castor oil | 42.5 | 32.3 | 32.5 | 32.5 |
| Trifunctional polyether polyol ($M_n$ 450) | 8.0 | 8.0 | 8.0 | 8.0 |
| Molecular sieve | 4.3 | 4.3 | 4.3 | 4.3 |
| Filler ($CaCO_3$) | 42.9 | 42.9 | 42.9 | 42.9 |
| Aerosil | 2.3 | 2.3 | 2.3 | 2.3 |
| Gum resin (Abietol E) | 0 | 10 | 0 | 0 |
| Acetophenone/formaldehyde resin, hydrogenated | 0 | 0 | 10 | 0 |
| Cyclohexanone/formaldehyde resin | 0 | 0 | 0 | 10 |
| Crude MDI | 26 | 18.3 | 30 | 27 |

A mixture is produced by vigorously stirring together the polyols, the resin and the pigment. To this end, the isocyanate is admixed as curing agent immediately before adhesive bonding. The two-component adhesive is used immediately for adhesive bonding. Standard test pieces are cleaned with isopropanol prior to adhesive bonding. Then the adhesive is applied in a thin layer and a second substrate is adhesively bonded in overlapping manner and immobilized with clamps. Curing takes place for 7 days at room temperature (approx. 25° C.).

The test specimens are then measured and subjected in parallel to an alternating climate test and measured thereafter.

| | Tensile shear strengths in MPa Alternating climate test cycles | | | | | | | |
|---|---|---|---|---|---|---|---|---|
| | 0 | 20 | 0 | 20 | 0 | 20 | 0 | 20 |
| | Test 1 | | Test 2 | | Test 3 | | Test 4 | |
| Aluminum/Al | 13.3 | 6.8 | 11.1 | 7.3 | 15.9 | 16.0 | 16.9 | 17.0 |
| Steel/St | 13.0 | 5.9 | 14.6 | 6.6 | 13.8 | 13.6 | 15.8 | 15.7 |
| V2A/V2A | 9.0 | 4.1 | 7.8 | 4.0 | 12.0 | 12.2 | 12.8 | 12.6 |
| ABS/ABS | 3.9 | 2.0 | 3.8 | 3.0 | 4.6 | 5.0 | 5.1 | 5.6 |
| PC | 6.6 | 4.8 | 3.3 | 3.0 | 7.7 | 7.7 | 7.9 | 8.0 |
| PMMA | 3.7 | 1.5 | 3.6 | 1.5 | 4.1 | 4.5 | 5.5 | 5.8 |
| Epoxide | 13.0 | 10.1 | 11.8 | 9.1 | 15.4 | 15.7 | 16.7 | 16.8 |
| Tensile shear strength: | DIN 53283, EN 1465 | | | | | | | |
| Alternating climate test: | 20 cycles each of 12 h between −40° C. (0% RH) and 80° C. (100% RH) | | | | | | | |

The tests according to the invention show that no loss in strength occurs under the conditions of the alternating climate test.

A further test specimen is introduced into an aluminum beaker, overlayered with water and crosslinked at room temperature. The surface and an interface do not display any foaming.

An adhesive according to test 3 is adhesively bonded to two aluminum substrates and cured in water.

An adhesive according to test 4 is adhesively bonded to two ABS substrates and cured directly in an alternating climate chamber.

Both test samples display excellent adhesive bonding.

The invention claimed is:

1. A method for adhesive bonding of metal or plastics substrates, comprising:
   adhering contaminants are removed from the substrate,
   a two-component polyurethane adhesive is applied directly onto at least one substrate without applying a primer,
   and the substrates are fitted together and the assembly is cured, wherein the two-component polyurethane adhesive consists of a polyol component A, consisting of
   1 to 98 wt. % of at least one oleochemical polyol
   1 to 10 wt. % of at least one other tri-, tetra- or penta-functional polyol with a molar mass of 90 to 750 g/mol,
   2.5 to 60 wt. % of at least one aldehyde, ketone or ketone/aldehyde resin with a molecular weight of 250 to 25000 g/mol, in each case relative to component A, and
   0 to 70 wt. % of further auxiliary substances selected from fillers, pigments, leveling agents, deaerating agents, thixotroping agents, catalysts, antioxidants, UV stabilizers, dyes, solvents, wetting agents, bonding agents and plasticizers,
   wherein component A does not contain diols having a molecular weight below 300 g/mol;
   and a component B, containing at least one polyisocyanate, in which the NCO:OH ratio of the isocyanate component to the polyol component is between 1.0 and 2.0:1.

2. The method as claimed in claim 1, wherein the substrate consists of metals or alloys.

3. The method as claimed in claim 1, wherein the plastics substrate is selected from PVC, polycarbonate, polystyrene, ABS, PMMA, epoxy resins, polyamides, polyurethanes, polyesters and blends of these plastics.

4. The method as claimed in claim 1, wherein curing is carried out at a temperature of between 15 and 60° C.

5. The method as claimed in claim 1, wherein the adhesively bonded substrates are heat-treated at a temperature of between 30 and 80° C. for 5 to 200 hours.

6. The method as claimed in claim 1, wherein curing is carried out under aqueous or moist ambient conditions.

7. The method as claimed in claim 1, wherein the two-component PUR adhesive is applied in a quantity of 20 to 500 g/m².

8. The method as claimed in claim 1, wherein the two-component PUR adhesive contains 2.5 to 60 wt % of a ketone/formaldehyde resin.

9. The method as claimed in claim 1, wherein the two-component PUR adhesive contains 2.5 to 60 wt. % of a cyclohexanone/formaldehyde resin.

10. The method as claimed in claim 1, wherein the two-component PUR adhesive contains 0.5 to 50 wt. % of at least one pigment or filler in powder form as auxiliary substance.

11. The method as claimed in claim 1, wherein aromatic polyisocyanates and mixtures thereof with a functionality of between 2.0 and 2.8 are used as component B.

12. A method of bonding metal or plastic substrates using a flowable two-component polyurethane adhesive comprising: providing a polyol component A consisting of
   1 to 98 wt. %, relative to the polyol component, of at least one oleochemical polyol,
   1 to 10 wt. % of at least one tri-, tetra- or penta-functional polyol with a molecular weight of 90 to 750 g/mol,
   2.5 to 60 wt. % of an aldehyde, ketone or ketone/aldehyde resin with a molecular weight of 250 to 25000 g/mol, and
   0 to 70 wt. % of further auxiliary substances selected from fillers, pigments, leveling agents, deaerating agents, thixotroping agents, catalysts, antioxidants, UV stabilizers, dyes, solvents, wetting agents, bonding agents and plasticizers, wherein component A does not contain diols having a molecular weight below 300 g/mol;

providing a component B comprising at least one polyisocyanate, in which the NCO:OH ratio of component B to component A is in the range from 1.0:1 to 2.0:1;

mixing components A and B;

providing a substrate;

applying the mixed adhesive to the substrate; and disposing another substrate on the applied adhesive;

wherein no primer is used on the substrate.

13. The method as claimed in claim 12, for adhesive bonding under aqueous or moist ambient conditions.

14. The method as claimed in claim 12 for adhesive bonding of plastics substrates selected from polycarbonate, polyvinyl chloride, polystyrene, ABS, PMMA, polyamide, polyesters or polyurethanes, in particular of substrates which are not in sheet form.

15. The method as claimed in claim 12 for adhesive bonding of substrates made of metals and metal alloys.

* * * * *